W. YOUNG.
PLASHED FENCE.
No. 185,616. Patented Dec. 19, 1876.
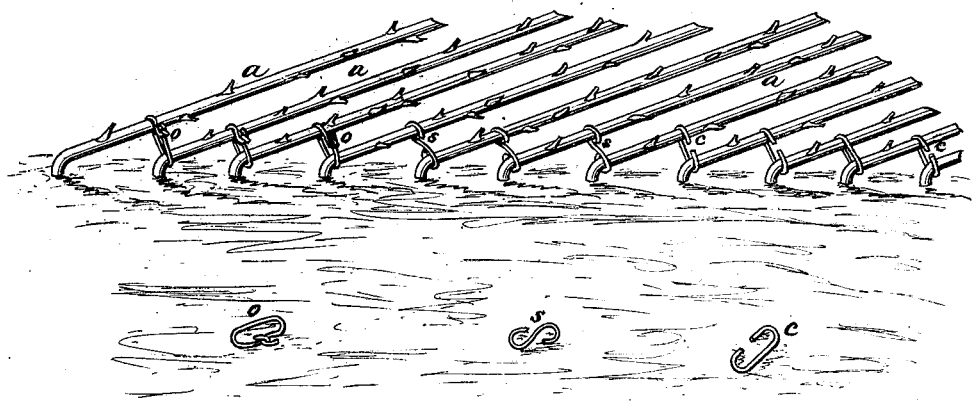
Fig. 1.
Fig. 2.
Fig. 3.
Witnesses:
Grenville Lewis.
Melville Church.
Inventor:
Wesley Young,
By Hill, Ellsworth & Spear
His Attys.

UNITED STATES PATENT OFFICE.

WESLEY YOUNG, OF COLUMBUS, OHIO.

IMPROVEMENT IN PLASHED FENCES.

Specification forming part of Letters Patent No. 185,616, dated December 19, 1876; application filed June 7, 1876.

*To all whom it may concern:*

Be it known that I, WESLEY YOUNG, of Columbus, in the county of Franklin and State of Ohio, have invented a new and useful Improvement in Plashing Hedges; and I do hereby declare the following is a full, clear, and exact description of the same, reference being had to the accompanying drawing, forming a part of this specification, in which my invention is represented by a perspective view.

This invention is an improvement upon the invention of David M. Kirkbride, which consisted in bending down the twigs or canes in line with the fence to be made, and connecting them together, so as to hold them down in the proper relative position by means of a continuous line of flexible wire, cord, or other similar continuous fastening. Said Kirkbride's invention was a valuable improvement upon prior modes of plashing, but was liable to the objection that it was somewhat inconvenient and difficult to apply the continuous wire or cord, as the free end thereof must be coiled and passed through back and forth between the canes in the act of plashing.

My present improvement therefore consists in connecting the twigs or canes in pairs by means of short links, hooks, or loops formed of flexible or inflexible material not a part of the growing hedge, substantially as shown in the accompanying drawing.

In said drawing, *a a a* represent the growing canes or twigs, said canes being bent near the surface of the ground, and inclined over in line with the fence to be made, and being arranged as nearly as possible parallel to each other from said point of bending near the ground to their upper ends, as shown. Various forms of connections are represented—as, for example, at *c*, where a C-shaped double hook is shown, one end of which is adapted to hook over one twig, while the other end hooks over the adjacent twig; one at *s*, where an S-shaped double hook is used; and one at *o*, where a round or oblong loop is employed. These connections, or others similar in general character, may be formed of wood, cast, wrought, or struck-up metal wire, or even strong durable cord, such as waxed twine; and when twine is employed it may be used in short pieces by simply passing it around the two twigs and tying its ends together.

Of course, the wires or other connections might be made in links long enough to embrace three, or even more, of the twigs—for example, as shown at *m*; but such a construction, if not coming within the description of said Kirkbride's invention, would be an obvious and colorable modification of my above-described invention, which is best applied when the links are limited to the connection of only two of the twigs, as above set forth.

Among the advantages of this invention over the continuous fastening are the following, viz: First, the links can be applied more easily and rapidly, and the twigs can be held in position with less difficulty while applying the fastening. Secondly, the link holds at its lower end at the bend or angle of the twig below, thereby not tending to bend or flex the lower twig, while it holds at its upper end at a distance from the bend or angle of the upper twig, thereby having considerable leverage upon the upper twig, and thus keeping it straight from the angle to its upper end, and not abrading the bark or interfering with its growth. In common with the continuous fastening, it has the advantage of holding the twigs parallel with each other, keeping them well down toward the ground at the lower part of the hedge, so as to make the fence thoroughly tight and close along the ground, and of being not liable to unlacing by the growth of the plants or the action of wind or of cattle.

Having thus described my invention, what I claim as new, and desire to secure by Letters Patent, is—

1. The mode of plashing hedges above described, consisting, essentially, in bending the twigs down at a point near the ground, and then connecting them in pairs by means of links or loops, applied substantially as described.

2. The plashed hedge-fence herein described, consisting, essentially, of the twigs *a a*, bent down as shown, and combined with the independent links, applied to couple them in pairs, substantially as described.

WESLEY YOUNG.

Witnesses:
WILLIAM P. BROWN,
JAS. FINLEY BROWN.